(12) United States Patent
Van Den Aker et al.

(10) Patent No.: US 10,273,943 B2
(45) Date of Patent: Apr. 30, 2019

(54) HEAT SENSITIVE ACTUATOR DEVICE

(71) Applicant: KONINKLIJKE PHILIPS N.V., Eindhoven (NL)

(72) Inventors: Karel Johannes Adrianus Van Den Aker, Liempde (NL); Daan Anton Van Den Ende, Breda (NL)

(73) Assignee: Koninklijke Philips N.V., Eindhoven (NL)

( * ) Notice: Subject to any disclaimer, the term of this patent is extended or adjusted under 35 U.S.C. 154(b) by 119 days.

(21) Appl. No.: 15/504,355

(22) PCT Filed: Sep. 6, 2015

(86) PCT No.: PCT/EP2015/070312
§ 371 (c)(1),
(2) Date: Feb. 16, 2017

(87) PCT Pub. No.: WO2016/037952
PCT Pub. Date: Mar. 17, 2016

(65) Prior Publication Data
US 2017/0234306 A1    Aug. 17, 2017

(30) Foreign Application Priority Data
Sep. 9, 2014   (EP) .................................... 14184021

(51) Int. Cl.
*F03G 7/06*    (2006.01)
*C22C 19/00*   (2006.01)

(52) U.S. Cl.
CPC ............ *F03G 7/065* (2013.01); *C22C 19/007* (2013.01)

(58) Field of Classification Search
CPC .................................. F03G 7/06; F03G 7/065
See application file for complete search history.

(56) References Cited

U.S. PATENT DOCUMENTS

| | | |
|---|---|---|
| 7,104,056 B2 | 9/2006 | Taya et al. |
| 8,586,176 B2 | 11/2013 | Taya et al. |
| 8,641,850 B2 | 2/2014 | Xie |
| 2004/0191556 A1 | 9/2004 | Jardine |
| 2004/0197519 A1 | 10/2004 | Elzey et al. |
| 2006/0038643 A1 | 2/2006 | Xu et al. |
| 2009/0130391 A1* | 5/2009 | Taya .................. B29C 61/0608 428/172 |
| 2009/0320992 A1 | 12/2009 | Xu et al. |
| 2010/0063506 A1 | 3/2010 | Fox et al. |
| 2013/0239565 A1 | 9/2013 | Browne et al. |
| 2014/0007572 A1 | 1/2014 | Buravalla et al. |

FOREIGN PATENT DOCUMENTS

DE        10142998 A1    3/2003

* cited by examiner

*Primary Examiner* — Jonathan Matthias

(57) ABSTRACT

A heat sensitive actuator utilizes a bilayer of shape memory material, each layer thermally stimulated to change shape at a different temperature, to generate two-way actuation functionality. The second layer—with higher phase-change temperature—brings up greater intrinsic force in its high temperature phase than the first, and in this way is able to be used to reset the actuator to its initial shape after being deformed by the first layer at a lower temperature.

15 Claims, 3 Drawing Sheets

T = T1 < T2
(a)

T > T3
(c)

T = T1 < T2

(a)

T2 < T < T3

(b)

T > T3

(c)

HEAT SENSITIVE ACTUATOR DEVICE

CROSS-REFERENCE TO PRIOR APPLICATIONS

This application is the U.S. National Phase application under 35 U.S.C. § 371 of International Application Serial No. PCT/EP2015/070312, filed on Sep. 6, 2015, which claims the benefit of European Patent Application No. 14184021.5, filed on Sep. 9, 2014. These applications are hereby incorporated by reference herein.

FIELD OF THE INVENTION

This invention relates to an actuator device, for providing an actuator response which is dependent on temperature. The invention further relates to manufacturing and use of the actuator device.

BACKGROUND OF THE INVENTION

There are many applications which could benefit from a reduced size actuator, but which can induce a significant stroke and apply a significant force.

Motors are most commonly used as actuators for generating large strokes and forces. For many miniaturized applications, even small motors are too large, heavy, noisy and expensive.

Shaped memory materials (SMMs), and especially their subset in the form of shape memory alloys (SMAs), are able to provide significant force and stroke when heated beyond their specific phase change temperature. Even if the dimensions of the material are small, the force and stroke delivered are, relative to these dimensions, very high and accurate, over a very long period of time and after many switching operations.

The use of shape memory materials to provide an actuation signal, dependent on temperature, has thus been investigated. For example, US2014/0007572 discloses the use of a shape memory alloy wire which contracts upon an increase in temperature above the phase-change temperature of the material, thereby engaging the actuator. Upon temperature decrease and transition of the wire back to low temperature phase, restoration of the original length of the wire, and hence resetting of the actuator, is achieved through the use of additional bias springs which stretch the wire back to its low temperature length.

The requirement for external biasing to reset the shape of the actuator is a disadvantage which follows from the fact that when there is a temperature decrease, the phase changes back to the original phase, but the shape does not. Thus, before the actuator can be used again, after a temperature decrease, an external actuation must be initiated to reverse the shape change of the SMM.

SUMMARY OF THE INVENTION

The invention seeks to provide an improved actuator device wherein activation is partly based on heat sensitivity of the actuator device. The heat sensitivity comes from the shape change response of the actuators shape memory materials layers on heating and cooling.

The invention is defined by the independent claims. The dependent claims provide advantageous embodiments.

According to the invention there is provided an actuator device, the manufacture of this actuator device and the use of the device in an apparatus that is at least partially controlled by the actuator device. The actuator device is heat sensitive in that its actuation is dependent on temperature changes. The actuator device can have at least two actuation steps.

The invention utilizes a structure that has two layers each comprising or consisting of at least one shape memory material. The shape memory material of these layers may or may not be the same material, as long as the phase-change temperatures of the two layers are different from one another. At the first temperature, the first layer is in its first memory shape as the shape memory material in this layer is then in its low temperature memory shape. The force exerted by the first layer as it transitions (changes) from its first to its second shape upon going from the first temperature to the second temperature exceeds the resisting force offered by the second layer during this heating to this second temperature. This excess force may be utilized to have the actuator deliver work during this first actuation step of the actuator device.

The device is further constructed such that upon heating form the second temperature to the third temperature, the second layer transitions (changes) its shape in such a way that the first layer changes towards its first shape, i.e. changes back to the original shape, during the second actuation step of the actuator device. To this end, the second layer is coupled to the first layer either directly, or via transfer mechanism/layers. Furthermore, the coupling is also such that if the first layer changes shape to its second shape, the second layer changes shape to its third shape. The force exerted by the second layer at this third temperature exceeds the (opposing) force exerted by the first layer, hence enabling a 'resetting' of the actuator system back to its original shape.

In the device, each layer has a one-way memory effect based on its shape memory material, but the combined device can be operated as a two-way memory effect device using only temperature as the control input, thus not requiring a separate actuation mechanism. Therefore, the invention provides an integrated sensor, actuator and controller in one, which fully avoids the need for external actuation to return the system to its original actuation state (shape). This opens up an enormous number of applications for the use of shape memory materials as small actuators with the ability to deliver work.

In the invention, the first layer and the second layer are coupled (attached) to each other at least partially to cause the shape change of one layer as a consequence of the shape change of the other layer. Such coupling is preferably in the form that at least one surface layer of the first layers is non-movably attached to at least one surface of the second layer directly without one or more bonding (intermediate) layers. Alternatively, intermediate layers may be there for bonding the first and second layers together. In fact an entire mechanical mechanism may be used to mechanically connect both layers as long as this is capable of transmitting the desired shape changes form one layer to the other layer. In the ultimate case, such as when both layers are joined together, the layers may be coupled together such that both follow the same shape during any of the activation steps of the device.

The first temperature may be below the phase change temperature of the first shape memory material and the second temperature above the phase change temperature of the first shape memory material.

Additionally, the second temperature may be below the phase change temperature of the second shape memory material, and the third temperature above the phase change temperature of the second shape memory material.

Using this arrangement, the first movement of the actuator, from the first to second shapes is stimulated by a heating of the system from the first temperature to the second temperature. The resetting of the system back to its original shape is stimulated by a further heating of the system to the third temperature. Subsequent actuation and resetting may be stimulated by further cycling between the first and third temperatures, which will respectively trigger the first actuation step or the second actuator step with which the actuation device can be reset to its original state.

The first and/or second layers may be configured such that a first product of the thickness and the modulus of elasticity of the second layer at the third temperature is greater than the second product of thickness and the modulus of elasticity of the first layer at the second temperature.

This means that when the system is at temperatures above the phase-change temperature of the second layer (greater than the third temperature), the intrinsic force exerted by the second layer exceeds that exerted by the first layer, enabling the shape-transition of the second layer to overcome the resistive forces of the first layer, and bring the entire system back to its first shape.

If the first and second layers consist of the respective first and second shape memory materials, then the moduli can be taken from published tables as being represented by the high temperature phases of the respective materials.

Various combinations of thicknesses and elastic moduli for the two layers may be used. Preferably, the first product is in the range 1 to 1.5 times, the second product. Then either one of the advantages described herein below for this range is attainable with the device.

In one example, the first product is in the range 1 to 1.1 times, for example in the range 1 to 1.05 times, the second product. Note that the phase change from the first shape to the second shape may take place over a narrow temperature range, for example of 1 to 2 degrees. Using this arrangement, residual force (that left over for doing work once overcoming resistive forces has been taken into account) is maximized for the first actuation step and minimized for the returning, second actuation step. Such an embodiment is tuned for doing maximal useful work on its actuating movement, and almost zero work on the return movement. It is achieved by having a small difference between the product values.

In another example, the first product is in the range 1.1 to 1.5 times, for example in the range 1.2 to 1.4 times, the second product. This arrangement is not attuned for maximal possible work in any one activation step, but rather allows for work to be done by the actuator on both actuation steps. The total possible work may be spread between the two activation steps. Different ratios of thickness-elasticity products allow this work distribution to be tuned.

In an alternative example the third product of the thickness and the modulus of elasticity of the second layer at the second temperature may be in the range 0.9 to 1 times, for example in the range 0.95 to 1 times, the fourth product of the elastic modulus and the thickness of the first layer at the second temperature. This example would maximize available work for the second (return) activation step and minimize available work for the first actuation step. In this case only just enough force is provided by the second layer for the first layer to overcome the resistive (counter) forces of the second layer when changing shape from the first shape to the second shape. At the corresponding temperature (the second temperature) the second layer has its low elastic modulus, with the result that the second layer has a substantially higher product of elastic modulus and thickness at the third temperature. For example the second layer may need to be significantly thicker than the first, and the force is maximized for the return movement of the second layer.

The first product in this example can be in the range 1.5 to 2 times the second product.

The first and second layers each may each have a ratio of the minimum modulus of elasticity below the phase change temperature of the respective first and second phase change materials to the maximum modulus of elasticity at the relevant phase change temperature which is between 0.6 and 0.3. This provides a significant change of shape at the phase change temperatures of the first and second phase change materials, and it is this change which enables work to be carried out during the first and second activation steps.

Different relationships between the phase-change temperatures of two layers may be used.

In one example, a relatively small difference between phase change temperatures is used, for example the difference between temperatures is less than 10 degrees, or even less than 5 degrees. Such an arrangement would be useful in applications in which a very sensitive, self-regulating actuator is required. Here the actuator can offer sensor-like functionality; the system transitions to the second shape upon reaching the second temperature, and remains in said shape only while the temperature remains at or close to the second temperature, transitioning back to the first shape once the temperature has risen above the third temperature.

In an alternative example, the difference between temperatures is greater than 10 degrees, for example greater than 20 degrees. Such an arrangement would be useful in applications where two-way sensing is required.

There are different possible shapes that may be used.

In one example, the first and second layers are coiled in shape so that the actuator might exhibit a spring like structure. In a preferred embodiment, the first and second layers are separately fabricated and trained into a coiled first shape. These two coils are then twisted into each other to form one spring with a double memory effect as described above.

Preferably, the first layer and/or the second layer consist of the first shape memory material and the second shape memory material, respectively. In this way the layer shape is entirely determined by the shape of the shape memory material in question as there is no other material in the layer(s). The first and/or second shape memory materials can be pure shape memory materials such as pure metal alloys of one kind, or they can be mixtures of different shape memory materials, such as different metal alloys. The shape memory materials can be organic materials such as polymers, but in view if increased power preferably are inorganic materials such as metal alloys.

In the invention the first shape memory material and/or the second shape memory material are metal alloys. Preferably both are the alloys of the same metals, but with different relative metal content. This allows good layer bonding and relatively simple adjustment of phase change temperature through change of relative metal composition.

In an embodiment the first and or second shape memory materials are chosen form the group of metal alloys comprising, or consisting of: Cu—Al—Ni, Ni—Ti. NiTi is preferred for most applications due its stability, practicability and superior thermo-mechanic performance.

In the invention, the first layer and the second layer consist of the respective first and second shape memory materials and the thickness of the first layer is greater than the thickness of the second layer. The difference in thickness may be greater than any one of the following values: 5%, 10%, 20%, 50%, 100%, 200%, or 500% of the thickness of the second layer.

The actuator device may be part of an apparatus in order to control one or more functions of the apparatus as a response of the actuator to temperature feedback. The temperature feedback can be because of the heating characteristics of the apparatus itself or from its surroundings. The apparatus can thus be an apparatus that provides heat upon operation or turning on, or changes heat output as a consequence of certain functions it performs. The apparatus can be: an electric, or combustion device such as an electric or combustion motor, a lighting device or a display device, a battery driven device, an electric charger, or manufacturing equipment such as a in a chemical plant. If temperature feedback comes from heat from the surroundings of the apparatus, the apparatus may be a control device for use in other apparatuses such as e.g. motors and many more. Such control devices include: motors, valves and switches of any kind that are based on mechanical movement and that require actuation with temperature feedback.

The invention provides a method of manufacturing an actuator device of the invention. In this method providing the first layer (32) can comprise:
 depositing a first film comprising or consisting of the first shape memory material on a sacrificial substrate (40);
 heat-treating said first film so as to induce the shape memory behavior to be exhibited by the first layer (32) of the heat sensitive actuator;
 deforming said first film back into the first shape; and providing the second layer (34) can comprise:
 depositing a second film comprising or consisting of the second shape memory material on the first film.

The invention also provides an actuation method or a use of an actuator device according to the invention, wherein, a first layer (32) comprising or consisting of a first shape memory material is heated to a second temperature to cause it to change shape from a first shape at a first temperature to a second shape at a second temperature higher than the first temperature in order to cause a first actuation step to occur; and
 wherein at least a second layer comprising or consisting of a second shape memory material, is heated to a third temperature to cause it to change shape from a third shape at the second temperature to a fourth shape at the third temperature higher than the second temperature, wherein the second layer (34) is coupled to the first layer (32) such that if the second layer changes to its fourth shape, the first layer changes to its first shape and wherein the second layer (34) is coupled to the first layer (32) such that if the first layer (32) changes shape to its second shape, the second layer (34) changes shape to its third shape.

BRIEF DESCRIPTION OF THE DRAWINGS

Examples of the invention will now be described in detail with reference to the accompanying schematic drawings, in which.

DETAILED DESCRIPTION OF THE EMBODIMENTS

Figure 1:
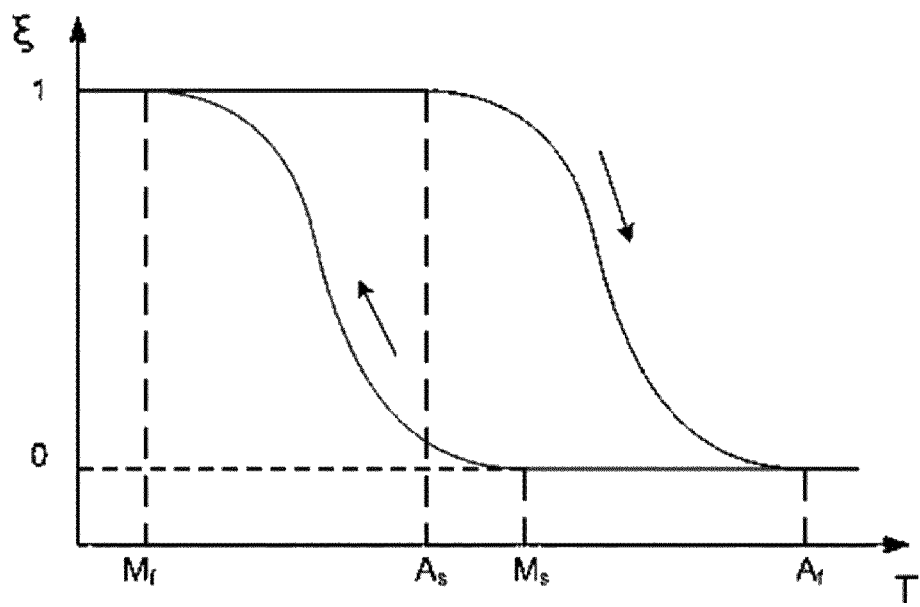
FIG. 1 shows the temperature-phase relationship for a shape memory material.

The invention provides a heat sensitive actuator which utilizes a bilayer of shape memory material, each layer thermally stimulated to change shape at a different temperature, to generate two-way actuation functionality. The second layer—with higher phase-change temperature—brings up greater intrinsic force in its high temperature phase than the first, and in this way is able to be used to reset the actuator to its initial shape after being deformed by the first layer at a lower temperature.

Shape memory materials (SMMs) are well known, in particular shape memory alloys (SMAs). The two main types of shape memory alloys are copper-aluminium-nickel, and nickel-titanium (NiTi), which is known as Nitinol. Nitinol is for example available in the form of a wire, rod and bar, or as a thin film. SMAs can however also be created by alloying zinc, copper, gold and iron.

SMMs can exist in two different phases, with three different crystal structures (i.e. twinned martensite, detwinned martensite and austenite).

Although iron-based and copper-based SMAs, such as Fe—Mn—Si, Cu—Zn—Al and Cu—Al—Ni, are commercially available and cheaper than Nitinol, Nitinol based SMAs are more preferable for most applications due to their stability, practicability and superior thermo-mechanic performance.

Nitinol has very good electrical and mechanical properties, long fatigue life, and high corrosion resistance. As an actuator, it is capable of around 6-7% strain recovery in the martensitic phase and around 14-15% in the austenitic phase, and high restoration stress with many cycles. It has a large difference in modulus of elasticity in the two phases, which enables the material to deliver a large amount of work while transforming phase.

Nitinol also forms a titanium oxide surface layer which shields the nickel from the outside, enabling biocompatible devices to be formed, such as stents or other implants.

A Nitinol wire 0.5 mm in diameter can lift as much as 6 kg. Nitinol also has resistance properties, which enable it to be actuated electrically by joule heating. When an electric current is passed directly through the wire, it can generate enough heat to cause the phase transformation.

In most cases, the transition temperature of the SMA is chosen such that room temperature is well below the transformation point of the material. Only with the intentional addition of heat can the SMA exhibit actuation. In essence, Nitinol can be used as an actuator, sensor, and heater all in one material.

Shape memory alloys, however, are not suitable for all applications. The forces, displacements, temperature conditions, and cycle rates required of a particular actuator need to be taken into account. The advantages of Nitinol become more pronounced as the size of the application decreases. Large mechanisms may find solenoids, motors, and electromagnets more appropriate. However, in applications where such actuators cannot be used, shape memory alloys provide an excellent alternative.

Nitinol alloys change from the martensite state to the austenite state when heated, and return when cooled.

FIG. 1 shows the martensite fraction as a function of heating, during heating and cooling. During heating As and Af are the temperatures at which the transformation from martensite to austenite starts and finishes. The temperature As is the transition temperature also called phase change temperature. During cooling, Ms and Mf are the temperature at which the transition to martensite starts and completes.

The difference between the heating transition and the cooling transition gives rise to hysteresis where some of the mechanical energy is lost in the process. The shape of the curve depends on the material properties of the shape memory alloy, such as the alloying and work hardening.

The transition from the martensite phase to the austenite phase is only dependent on temperature and stress, not time. When a shape memory alloy is in its cold state (below As), the metal can be bent or stretched and will hold those shapes until heated above the transition temperature. Upon heating, the shape changes to its original shape. When the metal cools again it will change phase but not shape, and thus remain in the hot shape, until deformed again.

With this one-way effect, cooling from the high temperatures does not cause a macroscopic shape change. A deformation is necessary to recreate the low temperature shape. The transition temperature As for Nitinol is determined by the alloy type and composition and can vary between −150° C. and 200° C. Generally, a transition temperature in the range −20° C. to 120° C. is used. Thus, the transition temperature can be tuned to a particular application.

There are also materials with a two way shape memory effect, based on cold work or hardening, with high stresses in the martensitic phase. However, the effect does not allow repeated temperature cycles, because stresses are released over time. This invention relates in particular to one way shape memory materials.

Figure 2:
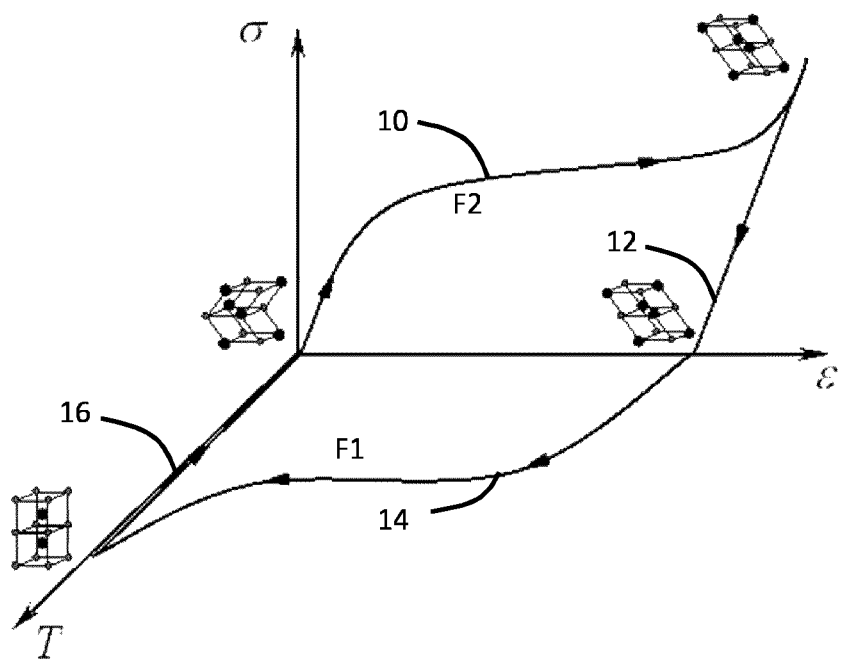
FIG. 2 shows the temperature-stress-strain relationship for a shape memory material.

As mentioned above, the phase transitions depend on stress as well as temperature. FIG. 2 is a schematic diagram showing a stress ($\sigma$)-strain ($\varepsilon$)-temperature (T) function for the shape memory effect. The material is annealed to remember a specific shape. The material is deformed into its low temperature shape along path 10 by applying a stress to the material. This is a detwinning region. There is a sharp increase in slope in the stress-strain curve after which the material becomes much more difficult to deform further. Once the stress is relieved shown as path 12, the large strain still stays in the material until heating above the transition temperature. This is the heating path 14 to bring the material to the austenite phase. It can then cool back into the twinned martensite phase along path 16 at which point the strain in the material has been relaxed. Note however that the shape has not changed back.

The Modulus of Elasticity (E-modulus) of the high temperature phase of the SMM is significantly higher than the E-modulus of the low temperature phase.

An elastic modulus, or modulus of elasticity, is a number that measures an object or substance's resistance to being deformed elastically (i.e., non-permanently) when a force is applied to it. The elastic modulus of an object is defined (as usual in science) as the slope of its stress-strain curve in the elastic deformation region. A stiffer material will have a higher elastic modulus. In the invention the first and or second layer may have an elastic modulus. This modulus may be the modulus of the SMM or SMA when a layer consists of the SMM or SMA. Those skilled in the art will be able to find such moduli as tabulated in standard materials data libraries (books etc.) or be able to measure such moduli using standard methods of measuring such moduli.

The shape change that accompanies this phase change during heating is able to deliver a first force F1. After the temperature decrease below the phase change temperature, and thus after phase change to the low temperature phase, a lower force F2 is necessary to reshape the SMM into its original form (path 10 in FIG. 2).

The required reshaping force can be provided manually, for example using a spring or some other external mechanical biasing.

The invention is based on the use of a dual layer of shape memory material, with the second layer providing the complementary reshaping force to bring the first layer of SMM (and consequently the whole structure) back to its original form.

Figure 3:
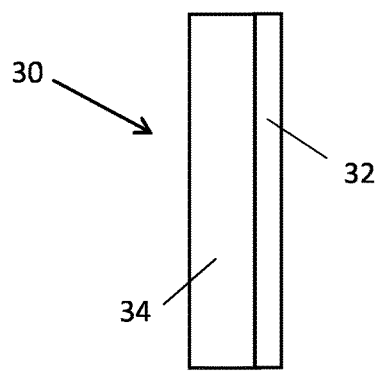
FIG. 3 shows an example of an actuator in accordance with the invention.
Figure 3:
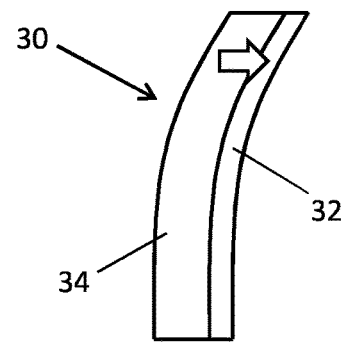
Figure 3:
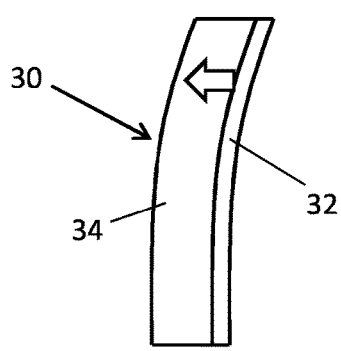

In FIG. 3 is shown an example of a simple embodiment of the invention. A first layer of shape memory material, 32, is mechanically coupled with a second layer, 34, to form an actuator structure, 30. In this case the actuator structure is, and moves as, a single cohesive body with both layers following the same shape. However, other mechanical coupling may be used as long as the two way effect remains. A first temperature T1 is below the phase change temperatures of the two layers. The first layer 32 has phase-change temperature T2, while the second has phase-change temperature T3, where T2<T3.

As the temperature of the system is heated from below to above the phase-transition temperature T2 of the first layer 32, this layer transitions to a (high temperature) phase of high modulus of elasticity that is significantly greater than the modulus of elasticity of this first layer 32 when in the low temperature phase. The greater stiffness of the first layer 32 relative to the second layer 34 at this stage—where the temperature lies between T2 and T3—means that the force exerted by the former as it transitions to its memory-shape exceeds any resisting force exerted by the second layer 34, which at this temperature is still in its martensite, low elastic-modulus phase. As a consequence, the whole actuator structure is deformed in alignment with the memory-shape of layer 32 to a first shape S1, such that while the system is at a temperature between T2 and T3, it adopts the deformed, 'actuating' second shape S2. Any excess force provided by the first layer 32 during its transition from S1 to S2 may be utilized for the delivery of work.

If the temperature of the system is further increased from below T3 to above T3, the second layer 34 is stimulated to transition from its low to its high temperature (and high Elastic modulus) phase, and to transition into its memory-shape. This is the shape S1.

The actuator will remain in shape S1 after cooling of the system from above T3 to a temperature below T2,—in consequence of forces exerted by layer 32, which is in its austenite phase at this temperature, overcoming resistive forces of layer 34, which is in its martensite phase at this temperature. Cycling between temperature T1 (which is any temperature below T2) and T3 cycles the actuator between its different states.

FIG. 3 shows the different states.

FIG. 3(a) shows the actuator at a temperature T1 below T2 and T3, (the two phase change temperatures of the SMMs). The bilayer is in a normal, not actuated, setting. If the material is used in environmental circumstances, this might be at room temperature.

With increasing temperature, at some moment T2 will be reached, as shown in FIG. 3(b). Although the first SMM layer 32 is thinner, the force brought up is high enough to change the shape of the total bilayer because the thicker layer 34 is still in the low stiffness low temperature phase.

At the moment the actuator needs to be brought back to its original shape, at first the temperature is raised even more, at least until T3 is reached as shown in FIG. 3(c).

The shape of the second layer 34 is changed, in the opposite direction. Since the second layer is thicker it brings up a higher force and thus it is able to reset the shape of the thinner layer also. During decreasing temperatures the shape of the bilayer does not change, so the actuator can be cooled back down to a temperature below T2 with the actuator maintaining the shape S1 shown in FIG. 3(a).

The tables below show calculations for three examples, in simplified form, to explain the operation of the actuator. The simplification is that it is assumed that the force calculated for a particular layer thickness is representative for the force over the cross section. It is further assumed that the force (per unit length) exerted by a particular layer at a particular temperature may be approximated by $F=E*d$, where E is the Elastic modulus of the layer at said temperature and d is the thickness of the layer. This is a very broad approximation and hence the calculated values are to be taken as illustrative of concept, rather than exact.

The first table below shows the characteristics of the two shape memory materials for the three examples:

|  | Example 1 | | Example 2 | | Example 3 | |
| --- | --- | --- | --- | --- | --- | --- |
| Material | SMM1 | SMM2 | SMM1 | SMM2 | SMM1 | SMM2 |
| Temp | T2 = 40 | T3 = 50 | T2 = 40 | T3 = 50 | T2 = 40 | T3 = 50 |
| E low (GPa) | 35 | 35 | 35 | 35 | 35 | 35 |
| E high (GPa) | 80 | 80 | 80 | 80 | 80 | 80 |
| thickness d (mm) | 4 | 4.1 | 4 | 5.5 | 4 | 8.7 |

The same materials are used for the two layers, but with different phase transition temperatures, and different relative thicknesses in the different examples.

The second table below shows the forces applied at the temperature T2 by the two layers, as well as the percentage this force represents compared to the maximum force in the system (which is the force applied by the thicker SMM at its phase transition temperature T3). The force is derived from the Elastic modulus at that temperature, namely E low when below the phase change temperature and E high when at the phase change temperature.

| | T = T2 | | | | | |
| --- | --- | --- | --- | --- | --- | --- |
| | Example 1 | | Example 2 | | Example 3 | |
| | Force | % age | Force | % age | Force | % age |
| bending force of SMM1 (kN/mm) | 320 | 98 | 320 | 73 | 320 | 46 |
| counter force of SMM2 (kN/mm) | 144 | 44 | 193 | 44 | 305 | 44 |
| Available actuation force (kN/mm) | 176 | 54 | 127 | 29 | 15 | 2 |

In this example, the force applied by the first layer is 320 kN/mm at its transition temperature T2 (80×4=320).

For example 1, the force applied by the second layer is 328 kN/mm at its transition temperature T3 (80×4.1=0.328). The counter force of the second layer is 44 kN/mm (35×4.1=144). The available actuation force is the net force (320−144=176). The percentages express these values in relation to the value 328 kN/mm.

For example 2, the force applied by the much thicker second layer is 440 kN/mm at its transition temperature T3 (80×5.5=440). The counter force of the second layer is 193 kN/mm (35×5.5=193). The available actuation force 128 kN/mm is the net force (321−193=128). The percentages express these values in relation to the value 440 kN/mm.

For example 3, the force applied by the even thicker second layer is 696 kN/mm at its transition temperature T3. The counter force of the second layer is 305 kN/mm (35×8.7=305). The available actuation force 15 kN/mm is the net force (320−305=15). The percentages express these values in relation to the value 696 kN/mm.

The table below shows the forces applied at the temperature T3 by the two layers, as well as the percentage this force represents compared to the maximum force in the system (which is again the force applied by the thicker SMM at its phase transition temperature T3).

| | T = T3 | | | | | |
| --- | --- | --- | --- | --- | --- | --- |
| | Example 1 | | Example 2 | | Example 3 | |
| | Force | % age | Force | % age | Force | % age |
| bending force of SMM2 (kN/mm) | 328 | 100 | 440 | 100 | 696 | 100 |
| counter force of SMM1 (kN/mm) | 320 | 98 | 320 | 73 | 320 | 46 |
| Available actuation force (kN/mm) | 8 | 2 | 120 | 27 | 376 | 54 |

By way of main stream typical example, as shape memory alloys the following alloys can be chosen: Cu—Al—Ni, Ni—Ti. However, others can be used These include: Ag—Cd 44/49 at. % Cd, Au—Cd 46.5/50 at. % Cd, Cu—Al—Ni 14/14.5 wt. % Al and 3/4.5 wt. % Ni, Cu—Sn approx. 15 at. % Sn, Cu—Zn 38.5/41.5 wt. % Zn, Cu—Zn—X (X=Si, Al, Sn), Fe—Pt approx. 25 at. % Pt, Mn—Cu 5/35 at. % Cu, Zn—Cu—Au—Fe, Fe—Mn—Si, Pt alloys, Co—Ni—Al [21], Co—Ni—Ga, Ni—Fe—Ga, Ti—Pd in various concentrations, Ni—Ti—Nb, and Ni—Mn—Ga. As is known perse, the ratio of metals in the alloys can be used to tune properties such as the phase transition temperatures. Those skilled in the art will know how and where to modify the alloys to obtain phase change temperatures needed. NiTi (Nitinol) is preferred for most applications due its stability, practicability and superior thermo-mechanic performance.

In the three examples, the two layers are Nitinol, and the elasticity values for Nitinol are used. The Nitinol layers have different phase change temperatures, but the same Elastic modulus as each other below the phase change temperature, and the same Elastic modulus as each other above the phase change temperature. The difference in properties is obtained only by changing the thickness. Nitinol is typically composed of approximately 50 to 51% nickel by atomic percent (55 to 56% weight percent). Making small changes in the composition can change the transition temperature of the alloy significantly.

Example 1 shows that the second shape memory material layer 34 ("SMM2") needs to be just a little thicker compared with the first one ("SMM1"). In the first example, 54% of the maximum force produced in the system is available for actuation in one direction, from shape S1 to shape S2.

In such an example, in which the force is desired for actuation in one direction only, the product of the (high) Elastic modulus and the thickness of the second layer may be in the range 1 to 1.1, or more preferably 1 to 1.05 times the product of the (high) Elastic modulus and the thickness of the first layer. If the layers are materials with the same Elastic moduli, then it follows that the thickness of the second layer may be in the range 1 to 1.1, or more preferably 1 to 1.05 times the thickness of the first layer. The delivered force is almost completely delivered during the movement in one direction (54% in the example shown) whereas only a small force sufficient to return to the first shape is delivered in the return direction (2%). The movement back is thus without delivery of force and requires absence of an external load.

The second example shows that if a force is needed in both directions the second 34 layer can be made to be a little thicker and the remaining available force can be essentially divided by 2 (29% in one direction and 27% in the other).

In this example, in which force is desired for actuation in both directions, the product of the (high) Elastic modulus and the thickness of the second layer may be in the range 1.1 to 1.5 times the product of the (high) Elastic modulus and the thickness of the first layer. The range may be 1.2 to 1.4 times. Again, if the layers are the material with the same elastic moduli, then the ratios apply to the thicknesses.

The third example shows that if a force is needed in the return direction only the second 34 layer can be made even thicker. This example involves bringing the counter force applied by the second layer at the second temperature T2 (when it is in its low Elastic modulus phase) to almost reach the actuation force applied by the first layer at the second temperature T2 (when it is in its high Elastic modulus phase). For this purpose, the maximum force which can be applied by the second layer will be much greater relative to the maximum force of the first layer. For example 3, the maximum force is increased to 696 KN/mm, so that the counter force of the second layer at the second temperature becomes 305 kN/mm leaving only 15 kN/mm force at temperature T2.

The examples above make use of the same material. However, different materials may be used, as it is the product of the modulus of elasticity and the thicknesses which dictate the force delivered.

In general, in order for the second layer 34 to overcome the resistive force of the first layer 32 during its transition back to the first shape S1, and so induce the entire actuator to adopt shape S1, the force delivered by layer 34 in its high temperature phase must exceed that delivered by layer 32 when in its high temperature phase (e.g. 328>320, 440>320 and 696>320 in the examples above). Where the layers are constituted of the same material, or, more broadly, where the high temperature elastic moduli of the two layers are very similar, the above requirement is met if layer 34 has a thickness which is greater than that of layer 32 as explained above. This derives from the fact that (permitting reasonable simplification), in general, the force exerted (per unit length) by a layer of material of thickness d and Elastic modulus E can be broadly approximated by E*d. Therefore, for materials of very similar E, and in particular for layers of the same length, the force exerted by one will exceed that exerted by the other, only if the thickness of the first is greater than the second.

However, in an alternative example, elastic moduli of the two layers differ from one another—in one or both phases of the materials. In this case, the condition that the force of the second layer exceed that of the first when both are in their high temperature phases is met by the broader approximated condition that E*d of the second layer exceed that of the first when at the relevant high temperature.

Thus, the two layers may be comprised of the same shape memory material, or may constitute different materials, but in either case, the two possess differing phase change temperatures.

The whole bi-layer structure moves as a single, cohesive body, with each layer mechanically co-dependent with the other. The two layers are thus connected together with strong connections, preferably over the total surface without air gaps, but such that each retains its specific material properties. Other layers may be present in the actuator element, in between the first and second layer or at the outer sides as long as they move with the respective changes of shape during the operation of the actuator element. Preferably, no such other layers are present. Note that the heat sensitive actuator of the invention can be attached to other layers in order to be used. Such other layers need not move with the actuator, and typically are attached to only one part of a layer to allow the actuator to have its shape change.

Embodiments which maximize the force in one shape change direction are most useful in applications where the actuation itself is mechanically demanding, requiring physical work to be completed. Examples of this might be an actuator which turns a valve on a pipe upon actuation, turns a lock, or in some other way involves the movement of a physical component.

Such embodiments may be particularly applicable in cases where gravity can be utilised to provide actuation in one of the two directions. For example, if opening a valve requires the lifting of an obstructing disk or member against gravity, then only the shape change from S1 to S2 need deliver work; the reverse actuation is performed by gravitational force alone. Such an embodiment is nonetheless advantageous over one-way actuators, since the gravitational force need only be strong enough to move the valve disk itself; it does not need to be strong enough to re-shape the entire actuator to its S1 form. The force for this of course is provided by the second shape memory material layer once it is heated to its high-temperature phase.

Alternatively, were the valve to be so arranged that gravity assists in opening it, but works against closing it, then it may be that only the shape transition from S2 to S1 need deliver significant work; the first movement of the valve disk is achieved almost entirely by gravity alone and force can be maximized for the return movement.

As well as varying thicknesses or other dimensional parameters (width and length) and elastic moduli of the layers, the difference between the phase-change temperatures of the two layers may be varied so as to generate actuators with differing functionality.

In one example, T2 and T3 are chosen so that they are very close to one another—the difference between them may be below 10 degrees or even below 5 degrees. In this case, the actuator behaves much like a sensor: the system adopts a particular shape (the second shape S2) only when the temperature lies within a particular narrow range, and changes to a different shape when the temperature is raised above this range (and subsequently cools to below the range).

In this way, a small difference between T2 and T3 delivers very sensitive self-regulating actuators. If, due to temperature increase after reaching T2 then also T3 is reached there is no other mechanism needed for the return actuation. This is desirable if the actuator is more used for sensing than for actuating.

If actuating in both directions is needed, the difference between T2 and T3 should be higher. An example is a lamp or luminaire system that mechanically opens up when turned on and closes after the light is put out. A larger difference in T2 and T3 is necessary since the lamp will increase in temperature during burning. This temperature however needs to stay below T3. Only after the signal for lamp shut down is given, the temperature can be increased for a very short period of time, such that temperature T3 is reached, initiating the closing of the luminaire. Then the energy is shut off and the whole system cools down ready to start again.

As well as enabling actuation triggered by environmental temperature changes, the invention also allows for direct control of the actuation cycle if a specific heat generating element (for example an electrical heating element) is attached to the actuator. In such an embodiment, actuation in either way is easily controlled by varying the current through the heating element, allowing for a system using the actuator to operate in an 'automatic' environmentally sensitive mode, but also to be manually 'overridden' by a computer program or a human being.

One example of such an application is an actuator which controls a cooling (or heating) valve in a piping system. The cooling valve is in an ON state when the actuator is actuated and cools the system when needed, for instance when the ambient temperature is too high (above T2). However, by forced heating (through an attached heating element) the cooling valve can be manually overpowered if needed in the application, switching off cooling valve when temperature T3 is reached. In this case, actuation in one direction is triggered 'automatically' in response to changing environmental temperature, while actuation in the alternate direction is externally controllable. The manual overpowering could be initiated routinely by a computer program: for example, after a pre-determined quantity of time has elapsed since actuation. Or, alternatively, the manual overpowering could be initiated simply through human intervention.

In an alternate example, actuation may trigger a process or event which is self-controlling, and does not require reverse actuation for restoration to an 'OFF' state. For instance, actuation which displaces a valve or gate which then returns itself to the original position at some later time. In this case, resetting of the actuator back to the first shape S1 through manual forced heating can be triggered straight away.

The actuator can have a strip shape as shown in the example above. An alternative design is based on a spring formed system in which two intertwined springs are made with different alloy compositions, and they are separately fabricated and trained. The springs can be twisted into each other to form one spring with a double memory effect as described above.

Figure 4:
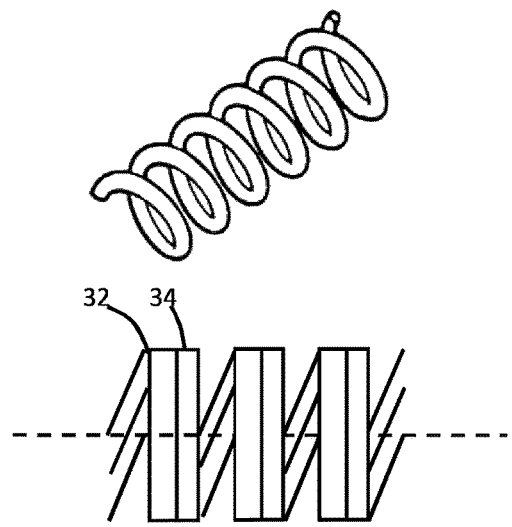
FIG. 4 shows a second example of an actuator in accordance with the invention.

FIG. 4 shows a spring structure with the two layers of shape change material 32, 34. The spring expands (or shrinks) with a temperature increase, and reforms back to the original after a further temperature increase. The coil spring has an elongate axis 50. The two layer structure explained above is stacked along the axis direction.

One possible method for manufacturing the actuator will now be described with reference to FIG. 5, which makes use of thin film techniques. Indeed, the high strength and thermal actuation of shape memory alloys make them perfect candidates for miniaturized actuators which can be made using thin film technology. Sputtered films of Ni—Ti also show shape memory effect. The double layer actuator can be made by thin film techniques.

Figure 5:
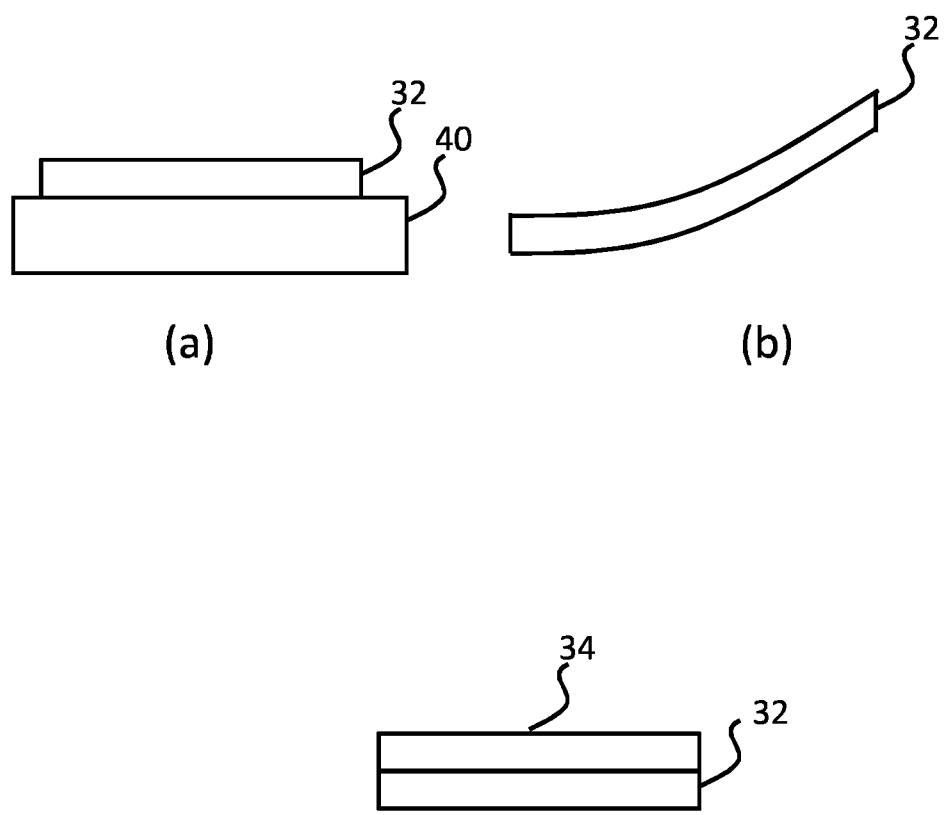
FIG. 5 shows an example of a method of manufacturing an actuator in accordance with the invention.

For example, the process shown in FIG. 5 involves sputtering the first layer 32 on a sacrificial substrate 40 as shown in FIG. 5(a). The film is then heat treated to obtain its shape memory effect when the substrate is removed as shown in FIG. 5(b). The film is then deformed back to its low temperature flat form and the second film 34 is then sputtered on the first film as shown in FIG. 5(b). The phase transition temperature of the second film is higher than the first film, to obtain the two-way effect described above.

In this way, the method of manufacturing the actuator using thin film techniques provides the requisite mechanical coupling between the layers—in order for the two to move as a single shape. However, they may instead be manufactured separately, and then joined, by bonding the layers together or coupling with mechanical fastenings, for example.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An actuator device, comprising:
   a first layer comprising or consisting of a first shape memory material which is configured to change shape from a first shape at a first temperature to a second shape at a second temperature higher than the first temperature; and
   a second layer comprising or consisting of a second shape memory material, which is configured to change shape from a third shape at the second temperature to a fourth shape at a third temperature higher than the second temperature, the second layer being coupled to the first layer such that if the second layer changes to the fourth shape, the first layer changes to the first shape,
   wherein the product of the thickness and the modulus of elasticity of the second layer at the third temperature is in the range 1 to 1.1 times the product of the thickness and the modulus of elasticity of the first layer at the second temperature.

2. An actuator device as claimed in claim 1, wherein the second layer is coupled to the first layer such that if the first layer changes shape to the second shape, the second layer changes shape to the third shape.

3. A actuator device as claimed in claim 1, wherein the first temperature is below the phase change temperature of the first shape memory material and the second temperature is above the phase change temperature of the first shape memory material.

4. An actuator device as claimed in claim 1, wherein the second temperature is below the phase change temperature of the second shape memory material, and the third temperature is above the phase change temperature of the second shape memory material.

5. An actuator device as claimed in claim 1, wherein the first layer and the second layer each have a ratio of the minimum modulus of elasticity below the phase change temperature of the first or second phase change material to the maximum modulus of elasticity at the phase change temperature of the first or second phase change material which is between 0.6 and 0.3.

6. An actuator device as claimed in claim 1, wherein the difference between the second temperature and the third temperature is:

less than 10 degrees; or
greater than 10 degrees.

7. An actuator device as in claim 1, wherein the first layer and the second layer are coiled.

8. An actuator device as claimed in claim 1, wherein the first shape memory material and the second shape memory material are metals or metal alloys.

9. An actuator device as claimed in claim 8, wherein the first and/or second shape memory materials are chosen from the group of alloys comprising or consisting of: Cu—Al—Ni, Ni—Ti.

10. An actuator device as claimed in claim 1, wherein the first layer and the second layer consist of the respective first and second shape memory materials and the thickness of the first layer is greater than the thickness of the second layer.

11. An apparatus comprising an actuator device as claimed in claim 1, wherein the actuator device is configured to control one or more functions of the apparatus as a response to temperature feedback.

12. Use of an actuator device as claimed in claim 1, wherein at least the first layer is heated to the second temperature to cause a first activation step of the actuator to occur; and wherein at least the second layer is heated to the third temperature to cause a second actuation step of the actuator to occur.

13. The actuator device of claim 1, wherein the difference between the second temperature and the third temperature is less than 5 degrees.

14. The actuator device of claim 1, wherein the difference between the second temperature and the third temperature is greater than 20 degrees.

15. A method of manufacturing a heat sensitive actuator, comprising:

providing a first layer comprising or consisting of a first shape memory material which is configured to change shape from a first shape at a first temperature to a second shape at a second temperature higher than the first temperature;

providing a second layer comprising or consisting of a second shape memory material, which is configured to change shape from a third shape at the second temperature to a fourth shape at a third temperature higher than the second temperature; and coupling the second layer to the first layer such that if the second layer changes to its fourth shape, the first layer changes to its first shape.

* * * * *